United States Patent [19]
Luigs et al.

[11] Patent Number: 5,425,282
[45] Date of Patent: Jun. 20, 1995

[54] MANIPULATOR

[76] Inventors: Willi Luigs, Boschstrasse 19; Günter Neumann, Strassburger Str. 16, both of D-4030 Ratingen, Germany

[21] Appl. No.: 964,701

[22] Filed: Oct. 21, 1992

[30] Foreign Application Priority Data
Oct. 21, 1991 [DE] Germany .................. 41 34 727.7
Mar. 4, 1992 [DE] Germany .................. 9202852 U

[51] Int. Cl.$^6$ ............................................. F16H 25/20
[52] U.S. Cl. ....................... 74/89.15; 74/424.8 R; 74/459; 108/143; 384/49; 384/57
[58] Field of Search ............. 74/89.15, 424.8 R, 459; 192/141, 143, 142 R; 384/34, 40, 49, 57; 248/657; 108/143

[56] References Cited

U.S. PATENT DOCUMENTS

| | | | |
|---|---|---|---|
| 1,485,016 | 2/1924 | Cardullo et al. | 384/39 |
| 2,215,107 | 9/1940 | Mulka | 74/459 |
| 2,876,650 | 3/1959 | Sangster | 192/143 X |
| 3,020,097 | 2/1962 | Bullard, III et al. | 384/39 |
| 3,030,155 | 4/1962 | Bullard | 384/39 |
| 3,113,807 | 12/1963 | Polidor | 384/49 |
| 3,563,617 | 2/1971 | Pritchard | 384/49 |
| 4,573,747 | 3/1986 | Frazee | 384/57 |
| 4,872,903 | 10/1989 | Periou | 74/459 X |
| 4,993,673 | 2/1991 | Hirose | 248/657 X |

FOREIGN PATENT DOCUMENTS

248423 9/1962 Australia .................. 384/49

OTHER PUBLICATIONS

"Verstellelemetne T und TS, Spindler & Hoyer Leaflet" (not dated).
"Die Verschiedenen Fuhrungsprinzipien" PI Leaflet (not dated).
"Mikromanipulator MM 33, Applicant's Leaflet, Mar. 1988".
"Koordinatenmeijtisch KTO" (not dated).
"Superior Micro Performance and Ease of O Four Independently Controllable Micromar", Narishize leaflet.
"Introduction to Positioning Equipment", Newport Leaflet.
"Range of Motion", pp. 10–11, Burleigh leaflet.

*Primary Examiner*—Allan D. Herrmann
*Attorney, Agent, or Firm*—Helfgott & Karas

[57] ABSTRACT

A manipulator includes a carriage, a base and a longitudinal guide for positioning the carriage. The longitudinal guide contains two guide parts attached to the base to provide a sliding mount for the carriage along an axis. A spindle is coupled to the carriage for moving it longitudinally and is provided with a rotating mount on the base. The manipulator also includes two wedge arrangements between the side parts of the base and the guide parts of the guide to center the carriage and pre-stress the guide parts in the direction of the axis. Each wedge arrangement comprises two cooperating slant faces one of which is an inner face of each side part of the base and the other of which belongs to a wedge which is moved with respect to the respective guide part for centering the same relative to the spindle. After completion of the centering operation the guide parts will be secured to the base, e.g. by screws.

15 Claims, 4 Drawing Sheets

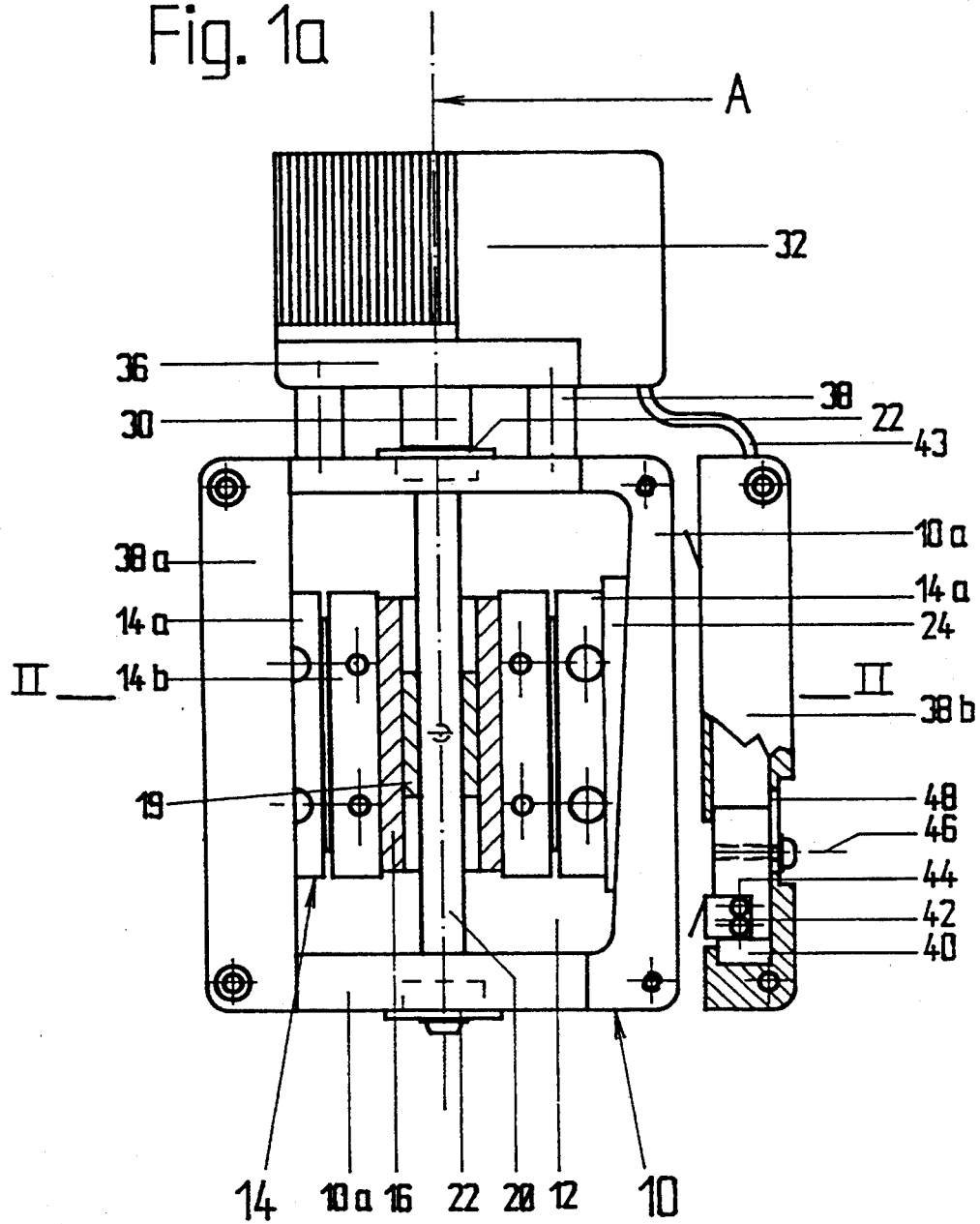

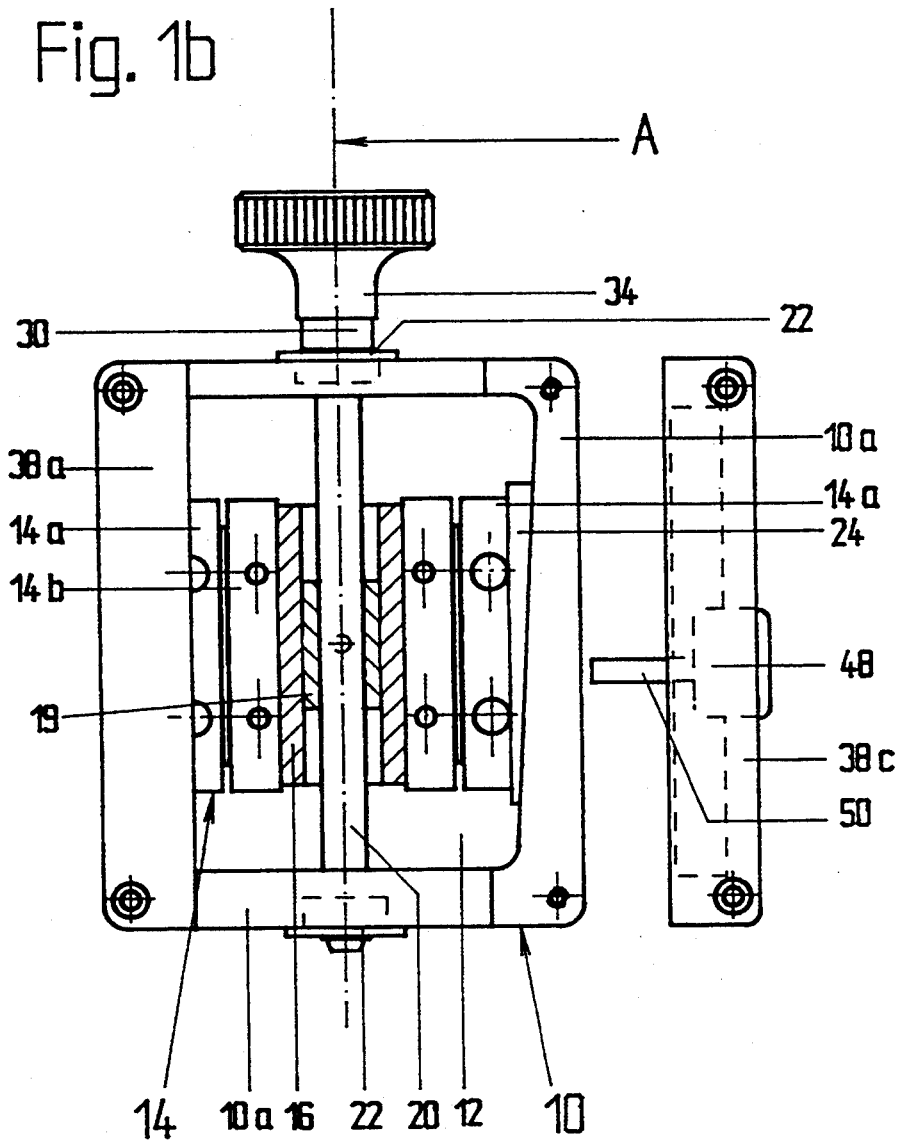

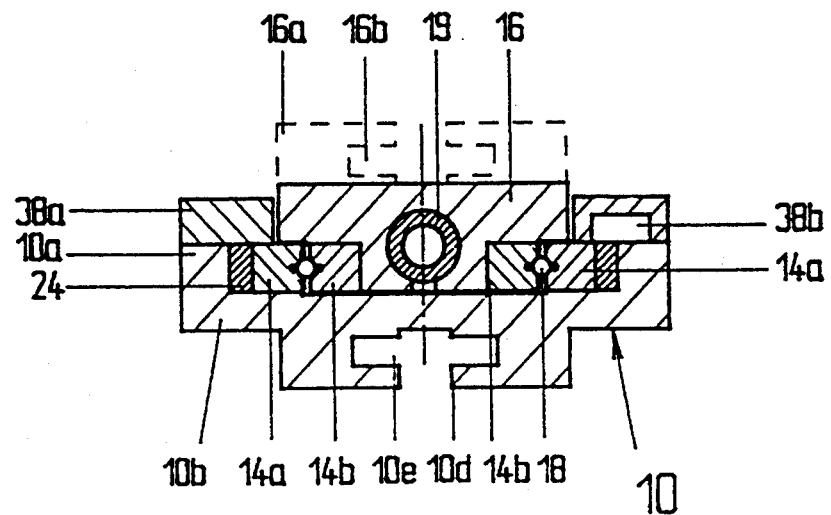
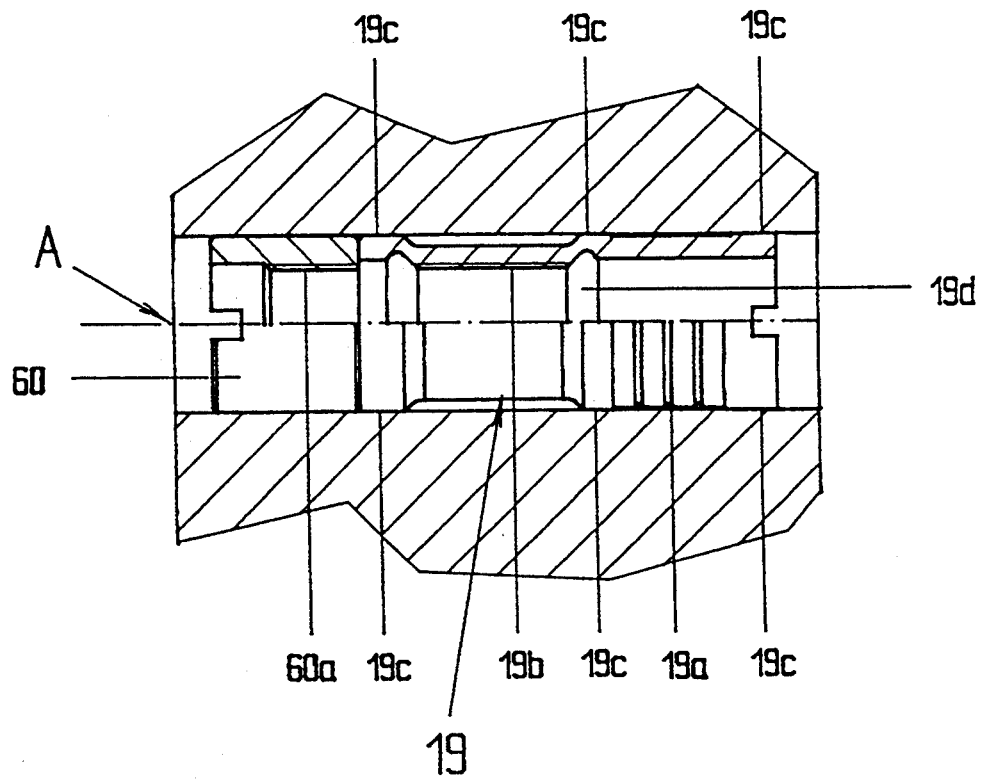

MANIPULATOR

FIELD OF THE ART

The present invention concerns a manipulator, i.e., a device with which an object such as a tool, a probe, a pipette, etc., can be moved in a controlled manner and positioned accurately.

BACKGROUND OF THE INVENTION

One essential requirement for manipulators is that they work precisely and reproducibly. This makes high demands of the precision of the longitudinal guidance which leads to high costs accordingly. However, the precision must be guaranteed not only for a manipulator fresh from the factory but must be maintained even with the often rough operation in the laboratory.

The present invention is based on the problem of developing a manipulator with a longitudinal guide that will guarantee accurate and reproducible operation over long periods of time while being easy to assemble and adjust.

SUMMARY OF THE INVENTION

This invention concerns a manipulator containing a carriage, a base part and a longitudinal guide for the carriage. The longitudinal guide contains two guide parts attached to the base part to provide a sliding mount for the carriage along an axis and it also includes a spindle coupled to the carriage for the purpose of moving it and with a rotating mount on the base part. According to a first aspect of this invention, the manipulator also contains a wedge arrangement between side parts of the base part and the guide parts in order to center the carriage and prestress the guide parts in the direction of the axis.

According to a second aspect of this invention, the guide arrangement contains a nut mounted on the carriage to engage with the spindle and made of a slightly elastic plastic such as a polymer containing both fluorine and carbon ("fluorocarbon polymer") such as PTFE or some other elastic plastic such as polyamide [nylon] and having an inside thread that is underdimensioned and has a difference in pitch with respect to the thread of the spindle (e.g., 2 $\mu$m per flight) so that it exerts a radial pressure on the spindle and equalizes wear on the thread of the nut.

According to another aspect of this invention, an overload protection nut made of a rigid material, especially metal, preferably bronze, with an inside thread that is slightly overdimensioned with regard to the thread of the spindle is provided in the bore of the carriage in addition to the plastic nut. Normally the carriage is actuated by the plastic nut and the overload protection nut is inactive because its thread is too wide. Under an overload, the plastic nut gives somewhat, so that the metal nut is then engaged with the spindle and overloading and damage to the plastic nut are thus prevented.

The present manipulator assures that the drive of the carriage will operate without any tolerance even after prolonged use due to the spindle and nuts. In addition, the nut which exerts a certain radial pressure on the spindle has a damping effect on the drive which is advantageous especially when the drive is by a stepping motor or similar device.

The fact that the longitudinal guide is adjusted by side wedges makes it possible to achieve an accurate guidance with a simple assembly. Replacement strips provide protection against soiling and also make it possible to easily adapt the manipulator to various applications and modes of operation. According to another advantageous embodiment, the carriage is optionally motor driven or manually adjusted.

BRIEF DESCRIPTION OF THE DRAWINGS

A preferred embodiment of this invention is described below with reference to the figures and additional features and advantages of this invention will be discussed. The figures show the following:

FIGS. 1a and 1b each shows a partial sectional top view of a uniaxial manipulator according to the invention, wherein FIG. 1a shows a strip part of one embodiment and FIG. 1b shows a strip part of another embodiment;

FIG. 2 shows a simplified cross section along line II—II of FIG. 1a;

FIG. 3 shows an enlarged longitudinal section through a nut and a carriage of FIGS. 1a and 1b, which nut is used with the present manipulator to couple a carriage to a drive spindle.

DESCRIPTION OF THE PREFERRED EMBODIMENTS

Figure 4:
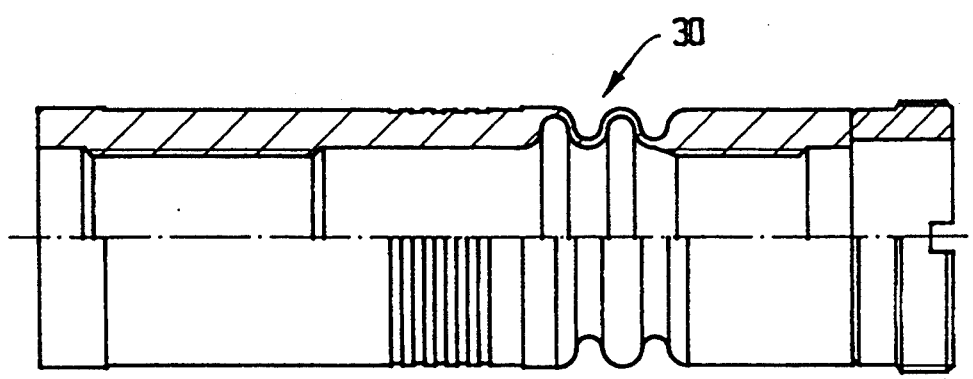
FIG. 4 shows a metal coupling with folded bellows.

The manipulator illustrated in FIGS. 1a, 1b, 2 and 3 permits an accurately controlled linear movement along a given axis A. It may be combined with a second manipulator whose direction of movement is at right angles to the aforementioned axis and may optionally also be combined with a lifting device in order to make it possible to move a certain object such as a tool, a pipette, a probe, etc., in two or three axes.

The uniaxial manipulator illustrated in FIGS. 1a and 1b consists of a one-part base 10, which has a trapezoidal recess 12 that is symmetrical with respect to axis A and is produced by cutting (as seen from above) and is bordered by a frame-like part 10a and a bottom 10b. Recess 12 contains a longitudinal guide 14 which contains two rail-like outer guide parts 14a connected to bottom 10b of the base by bolts, two inner rail-like guide parts 14b connected to a carriage 16 that has an approximately T-shaped cross section and a number of roller bearing elements 18 such as rollers or balls arranged between the neighboring inside and outside guide parts 14a and 14b and forming a roller bearing between these two parts. The roller bearing elements are held in a cage in the usual manner.

Base 10 has an integral shoulder 10d at the bottom, forming a T-shaped positioning groove 10e.

Carriage 16 has a longitudinal hole in which a nut 19 of PTFE or some other suitable wear-resistant, slightly elastic plastic that has good dimensional stability, such as some other fluorocarbon polymer, is glued. Nut 19, which is described in greater detail with reference to FIG. 3, is coupled to spindle 20. The spindle is held in the parallel side parts of frame part 10a by means of two ball bearings 22 that are held under tension with respect to each other and whose outer race rings are pressed into corresponding recesses in base 10. The nut which is shown on an enlarged scale in FIG. 3 has a ring-shaped bonding surface 19a on the outside with which it is bonded by means of an epoxy resin adhesive or some other suitable adhesive in the longitudinal borehole of the carriage. The adhesive surface 19a is formed by a relatively thick-walled unthreaded section of the nut whose inside diameter is larger than the outside diameter of spindle 20. The accurate radial positioning (side stability) of the spindle nut 19 is assured by means of three ring-shaped contact surfaces 19c that have a somewhat larger diameter than the thread section and the adhesive surface 19a and are in contact with the inside wall of the carriage bore. A relatively thin-walled threaded section with an inside thread 19b is next to the adhesive surface. The inside thread 19b has a somewhat greater depth of thread than the outside thread of spindle 20, so that the flights of the slightly elastic nut are compressed when the spindle is screwed in and thus nut 19 exerts a certain prestressing effect on the spindle. As a result of this prestressing, there is an automatic readjustment of the tolerance which equalizes the unavoidable wear on the spindle nut and in addition the prestress also has a damping effect on the spindle drive.

In a preferred embodiment, spindle 20 has a pitch of 0.5 mm. The inside thread of nut 19 has a 2 $\mu$m greater pitch per flight which with a thread length of 12 mm and 24 flights corresponds to a total of $24 \times 0.002 = +0.05$ mm.

Between the section forming adhesive surface 19a and the section containing inside thread 19b, the spindle nut 19 is provided with a ring groove 19d cut out on the inside. This slightly weakens the wall of the spindle nut at this point, so that when there is a strong axial load in the direction of axis A, the part of the thread of the spindle nut consisting of the slightly elastic material can shift somewhat with respect to the section that is fixed with respect to carriage 16 and has adhesive surface 19a.

In addition, an overload protection nut 60 is glued in the bore of carriage 16 with a slight axial distance from the end of spindle nut 19 facing the thread. The overload protection nut 60 has an inside thread 60a that is slightly overdimensioned with regard to the thread of the spindle so that in a normal case (without an overload) the drive of carriage 16 takes place exclusively by means of the engagement of the spindle in thread 19b of the spindle nut. When there is a severe overload, the spindle nut is deformed slightly in its threaded part and/or the part having the inside ring groove 19d without undergoing any damage, so that then the spindle nut 19 comes into engagement with the thread of the overload protection nut 60. The overload protection nut 60 in the embodiment illustrated here is made of bronze (red bronze or gun metal), so it can withstand high forces and protects spindle nut 19 from damage due to overloading.

Wedge 24 is inserted between the inclined contrarotating inside walls of the sides of the frame-like part 10a and the outer guide parts 14a of longitudinal guide 14. The wedge arrangement containing wedges 24 serves to center the longitudinal guide and apply an initial stress across the axial direction so that carriage 16 sits in the middle despite the greater tolerances of the guides and runs in an accurate and reproducible manner. For the purpose of adjustment, carriage 16 is arranged with spindle 20 that can be screwed into spindle nut 19 and overload protection nut 60 centered accurately in base 10 and then the longitudinal guide is subjected to prestress from both sides by means of wedges 24 and finally the outer guide parts 14a are secured on bottom 10b of base 10 by screws 80.

The upper end of spindle 20 in FIG. 1a extends outward above frame part 10a where it is joined, e.g., by bonding, to a coupling part of a metal folded bellows coupling 30 (shown in FIG. 4) that has a bore with a locking screw. Optionally a drive shaft of an electric motor 32 (FIG. 1a) or a hand wheel 34 (FIG. 1b) can be connected to this coupling 30 so that carriage 16 can be advanced either by motor drive or by hand. Motor 32 is mounted on a motor flange 36 (FIG. 1a) which is in turn bolted to base part 10 by means of two spacer bolts 38 which also provide thermal insulation. The operation of motor 32, which is especially a stepping motor, is damped in an advantageous manner by the inside thread 19b of nut 19 which has the dimensions described elsewhere.

Normally, a second manipulator unit is mounted on carriage 16 to permit movement along an axis at right angles to the axis of spindle 20. This second manipulator unit then covers a large portion of the opening of recess 12. However, in the end positions a small slit into which foreign bodies and dirt can penetrate may remain on the sides of frame-like part 10a. In order to prevent this, strip parts can be screwed to the longitudinal sides of the frame-like part 10a (preferably made of plastic for reasons of weight). In the simplest case, the strip parts are solid as illustrated by 38a in FIG. 2. However, the strip parts may also assume other functions in addition to the primary protective function in an advantageous manner. For example, one embodiment of the strip part 38b as shown at the right side of FIG. 1a may be provided, having a somewhat U-shaped cross section and a passage 40 on the inside at the bottom in FIG. 1a and also having a terminal switch 42 arranged so that it can be adjusted longitudinally in the hollow of strip part 38b by means of a crank 44. After adjustment of the terminal switch, the crank may be secured by means of a bolt 46 passing through an elongated hole 48.

Terminal switch 42 is coupled to motor 32 by means of line 43 and turns off the motor when the carriage 16 has reached the end position. A corresponding passage and a corresponding terminal switch are also provided on the other end of strip part 38b but only the projecting lamellar actuating element of the terminal switch is visible in FIG. 1a.

Another embodiment of the strip part 38c which is shown schematically in FIG. 1b has a U-shaped or L-shaped cross section and is used to mount an additional device 49 such as a scale 50 which is made of glass in the present case.

Carriage 16 may have an integral shoulder 16a (FIG.2) at the top forming a T-shaped groove 16b which corresponds to T groove 10e.

We claim:

1. Manipulator in combination with a carriage and adapted for controlled movement of the carriage, comprising means for moving the carriage along a given axis, a base having a bottom and two side parts, a longitudinal guide mounted on said base and including two adjustable guide parts for guiding the carriage when the carriage is moved along said axis by said moving means, said moving means including a spindle mounted to said base so that it can rotate, means for coupling said spindle to the carriage for moving the carriage along said given axis, said spindle being provided with a rotating mount on said base, and a wedge means including two wedges each being positioned between a respective one of said side parts of said base and an associated one of said adjustable guide parts of said guide so as to center the carriage and apply prestress to said guide parts in a direction of said axis, at least one of each of said side parts and guide parts having a tapered face co-operating with the respective wedge, and said adjustable guide parts including fastening means for fixing an adjusted position thereof after centering of the carriage.

2. Manipulator according to claim 1, wherein said base has a frame integral with said bottom and surrounding a trapezoidal recess, said frame including said side parts, said two wedges being in contact with longitudinal sides of the frame running at an oblique angle to the axis.

3. Manipulator according to claim 1, and further comprising strip parts assembled to longitudinal sides of the base to cover edge areas of a recess in said base, which receives the longitudinal guide.

4. Manipulator according to claim 3, wherein at least one strip part has a recess in which at least one switching device is adjustably positioned in the direction of said axis.

5. Manipulator according to claim 3, wherein one of the strip parts is designed as a holder for an additional device.

6. Manipulator according to claim 3, wherein at least one of the strip parts is a solid strip.

7. Manipulator according to claim 1, wherein said means for coupling said spindle to the carriage is a nut made of plastic.

8. Manipulator according to claim 1, wherein said spindle mounted to said base so that it can rotate has an outer thread; and further comprising a first nut attached to said carriage and engaged with said spindle, the first nut being made of an elastic material and having an underdimensioned inner thread with respect to the thread of the spindle so that it exerts a radial pressure on the spindle and equalizes wear on the thread of the first nut.

9. Manipulator according to claim 8, wherein the carriage has an axial bore, the first nut having a first axial section having an inner thread and a second axial section for attachment of the first nut in the bore.

10. Manipulator according to claim 9, wherein the first nut has a third section between the first and second sections with dimensions such that it allows a certain axial movement of the first section with respect to the second section when an excessive axial force acts on the first section; and further comprising a second nut made of a rigid material with an inner thread that is slightly overdimensioned with respect to the outer thread of the spindle and mounted axially in the bore next to the first nut.

11. Manipulator according to claim 8, wherein the first nut is made of a fluorocarbon polymer such as PTFE.

12. Manipulator according to claim 10, wherein the second nut is made of metal.

13. Manipulator according to claim 10, wherein the first and second nut each have a surface with which they are glued in the bore of the carriage.

14. Manipulator according to claim 1, and further comprising a coupling mounted outside of said base at one end of said spindle, and drive means coupled to said coupling for rotating said spindle, said drive means being selected from the group consisting of a motor and a manually activated drive element.

15. Manipulator according to claim 14, wherein said coupling is a metal folded bellows coupling.

* * * * *